C. WEBB.
MANUFACTURE OF TASSELED BRAID.
APPLICATION FILED NOV. 25, 1914.
1,158,603.
Patented Nov. 2, 1915.
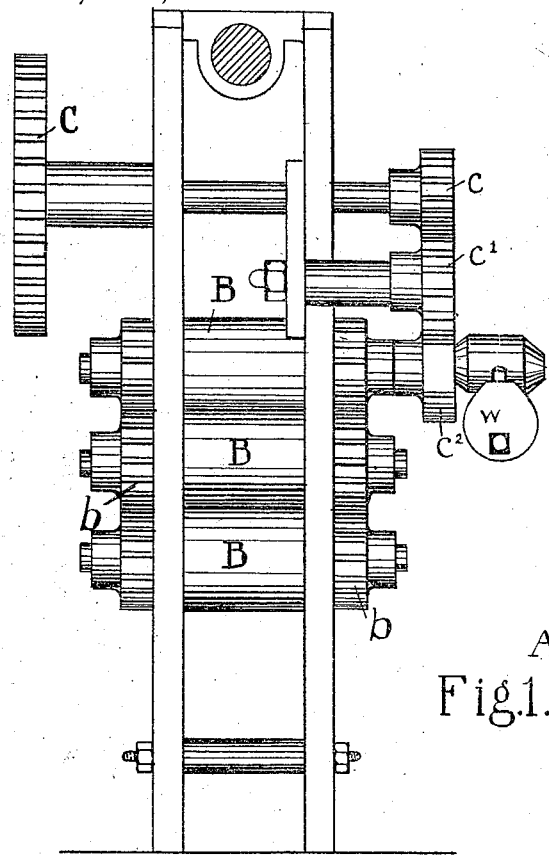
Fig.1.
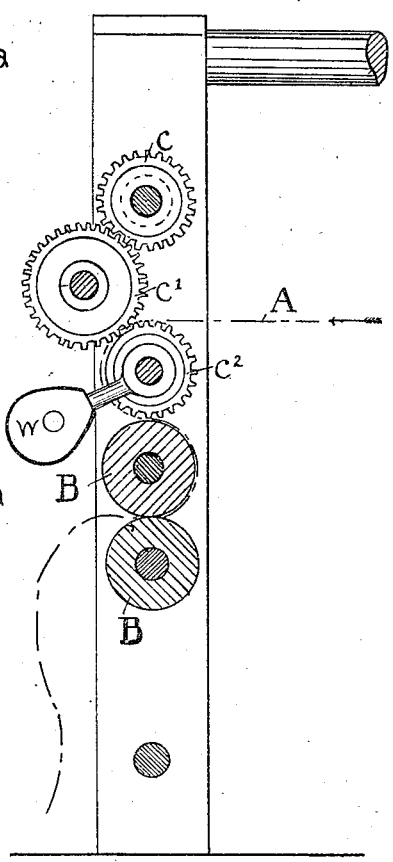
Fig.3.
Fig.4.
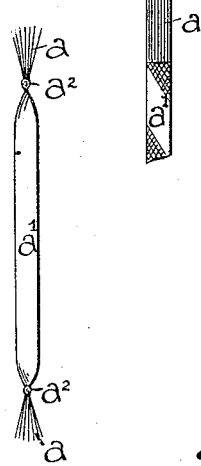
Fig.2.
WITNESSES.
M. E. McAade
INVENTOR.
Cyrus Webb
by James L. Norris
Attorney

UNITED STATES PATENT OFFICE.

CYRUS WEBB, OF HAZEL GROVE, ENGLAND, ASSIGNOR TO THE HAT MANUFACTURERS SUPPLY COMPANY LIMITED, OF STOCKPORT, ENGLAND.

MANUFACTURE OF TASSELED BRAID.

1,158,603.

Specification of Letters Patent. Patented Nov. 2, 1915.

Application filed November 25, 1914. Serial No. 874,035.

*To all whom it may concern:*

Be it known that I, CYRUS WEBB, a British subject, residing at Hazel Grove, county of Chester, England, have invented certain new and useful Improvements in the Manufacture of Tasseled Braid, of which the following is a specification.

In the manufacture of tasseled braid, that is, short lengths of braid with floss at both ends for the manufacture of small bows or looped knots such as are employed for ornamenting the sweat bands of hats, it is customary to cut the braid into lengths and tie or knot onto the ends a bunch of loose threads or flossed silk.

This invention consists in the formation of the braid from which the tasseled bows are made with spaces or lengths at intervals of loose unbraided threads from which the tassel can be formed alternating with braided lengths of the material.

The invention will be fully described with reference to the accompanying drawings in which means are illustrated for carrying it out.

Figure 1 is a length of braid showing the lengths of loose unbraided threads alternating with the braided lengths of the material. Fig. 2 is a piece of the finished tasseled braid after being cut or knotted. Fig. 3 is a front elevation of the draw off or delivery rollers of a braiding machine showing means for forming the loose unbraided lengths of material. Fig. 4 is a transverse sectional elevation of same.

The braid A is produced in any ordinary or well known form of braiding machine by giving to the finished material an accelerated movement after a length $a'$ has been braided and thereby drawing through the machine a length $a$ of the threads in a straight or unbraided condition. The braid A is drawn through the braiding machine in the usual way by draw off rollers B and to these rollers during part of every revolution a greatly accelerated speed is imparted so as to draw through a portion $a$ of the threads without being braided thus producing a strip of braid A with a braided or plaited length $a'$ and a loose or unbraided length $a$ alternating with one another. The rollers B are geared together by a train of wheels $b$ and are driven from any source of power by a wheel C and wheels $c$ $c'$ $c^2$.

To effect the acceleration of the speed of the rollers B the last wheel $c^2$ of the train may be formed blank or without teeth for a portion of its periphery and provided with a weight W sufficiently heavy to rotate the rollers B. The rollers will be driven by the pinion $c'$ gearing with $c^2$ until the weight travels from the position shown in Fig. 3, to the upper side of the wheel. The gap in wheel $c^2$ then allows the weight to fall and wheel $c^2$ to rotate rapidly until the teeth reengage thus driving the rollers at an accelerated speed and drawing through the desired length of unbraided material $a$. Any other suitable mechanism may be employed to give the rollers B a rapid movement at intervals to draw the threads $a$ through the machine unbraided. The braid A when completed is cut into lengths transversely through the center of the unbraided portion $a$ and knots $a^2$ tied thereon to form tassels at the ends.

What I claim as my invention and desire to protect by Letters Patent is:—

1. A braid with lengths of braided material alternating at intervals with lengths of straight threads substantially as described.

2. Forming a braid with lengths of braided material and lengths of straight threads alternating at intervals by rapidly drawing the threads through the braiding machine after a predetermined length has been braided substantially as described.

3. A tasseled braid comprising a central braided portion and ends of straight threads with knots tied between the two parts substantially as described.

In testimony whereof I have hereunto set my hand in presence of two subscribing witnesses, this 11th day of November 1914.

CYRUS WEBB.

Witnesses:
J. OWDEN O'BRIEN,
GEO. H. O'BRIEN.